Figure 1:
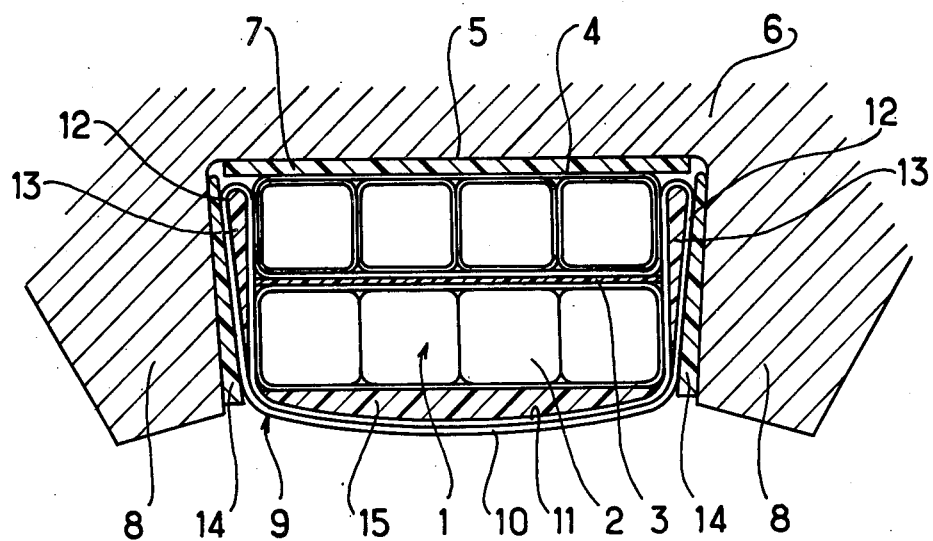

United States Patent [19]
Gillet et al.

[11] 4,068,142
[45] Jan. 10, 1978

[54] DEVICE FOR FIXING WINDING BARS ON A STATOR OF AN ELECTRIC ROTATING MACHINE

[75] Inventors: Roger Gillet; Jacques Carlier, both of Belfort, France

[73] Assignee: Societe Generale de Constructions Electriques et Mecaniques Alsthom, Paris Cedex, France

[21] Appl. No.: 620,455

[22] Filed: Oct. 7, 1975

[30] Foreign Application Priority Data

Oct. 8, 1974 France .................................. 74.33785

[51] Int. Cl.² .............................................. H02K 3/48
[52] U.S. Cl. ..................................... 310/214; 310/194
[58] Field of Search .................... 310/184, 179, 64, 65, 310/176, 216, 214, 218, 180, 194, 254–258, 42, 271, 259

[56] References Cited

U.S. PATENT DOCUMENTS

| | | | |
|---|---|---|---|
| 2,092,058 | 9/1937 | Ferris | 310/194 |
| 2,561,352 | 7/1951 | Ferris | 310/180 |
| 2,711,490 | 6/1955 | Gynt | 310/194 |
| 3,405,297 | 10/1968 | Madsen | 310/258 |
| 3,566,171 | 2/1971 | Tichy | 310/184 |
| 3,596,120 | 7/1971 | Potter | 310/65 |
| 3,739,212 | 6/1973 | Koelbel | 310/194 |
| 3,777,197 | 12/1973 | Preston | 310/254 |

FOREIGN PATENT DOCUMENTS

| | | | |
|---|---|---|---|
| 662,260 | 4/1965 | Belgium | 310/64 |
| 948,431 | 8/1956 | Germany | 310/214 |

*Primary Examiner*—R. Skudy
*Attorney, Agent, or Firm*—Sughrue, Rothwell, Mion, Zinn and Macpeak

[57] ABSTRACT

Device for fixing winding bars on a stator of an electric rotating machine wherein bundles of bars are fixed by straps pulled at their ends by a system of chocks and wedges providing also for the holding of the bundles of bars in the circumferential direction.

6 Claims, 3 Drawing Figures

DEVICE FOR FIXING WINDING BARS ON A STATOR OF AN ELECTRIC ROTATING MACHINE

The invention concerns the fixing of winding bars on a stator of an electric rotating machine and, more particularly, of bars arranged in the air gap of an electrical generator. It is a known and advantageous practice to bring these bars together into groups, the fixing means then affecting the set of bars in a group. It must nevertheless be understood that the present invention would apply just as well to the case where each group comprised only one bar.

That fixing must be both rigid and capable of being dismantled when there is a contingent repair to be effected on the machine.

That problem has been solved according to the invention by grouping the bars together in bundles distributed along the circumference of the stator, applied by a bearing face against a corresponding support face of the magnetic circuit of the stator and clamped radially against that magnetic circuit by straps which surround them on their other faces and which are pulled at their ends by a system of chocks and wedges providing also for the holding of the bundles of bars in the circumferential direction.

The system of chocks and wedges can, more particularly, comprise chocks whose corss-section is substantially in the shape of an elongated triangle, which are fixed to the straps and which co-operate with wedges having a substantially trapezoidal cross-section shifted radially toward the magnetic circuit of the stator.

The straps can, to great advantage, be constituted by endless belts whose middle portion is formed by two lengths applied together, whereas the two ends form loops surrounding the said chocks.

These straps are made of an insulating material which can be constituted by glass fibres impregnated with a synthetic resin.

The said bearing faces and support faces are, to great advantage, plane faces.

The wedges which are radially shifted towards the magnetic circuit of the stator bear, in a first embodiment, against teeth of the magnetic circuit of the stator. In another embodiment, they are pulled radially by screws made of an insulating material which screw into insulating parts forming nuts, embedded in the magnetic circuit of the stator and driving wedges affecting two successive bundles of bars. These screws and nuts are, to great advantage, moulded parts, whose thread is more accurate than that of machined parts. The said insulating parts embedded in the magnetic circuit of the stator can comprise a radial extension used both as a guide for the chocks and as nuts for the screws. That extension can have parallel faces or inclined faces.

Forming chocks can be inserted between the straps and the opposite faces to the said bearing faces of the bundles of bars.

Examples of the embodiments of the invention, having no limiting character, will be described with reference to the accompanying diagrammatic figures.

These figures show a part cutaway view of a bundle of bars fixed on a magnetic stator circuit of an electric rotating machine:

FIG. 1 in the case of wedges clamped against teeth of the magnetic circuit.

Figure 2:
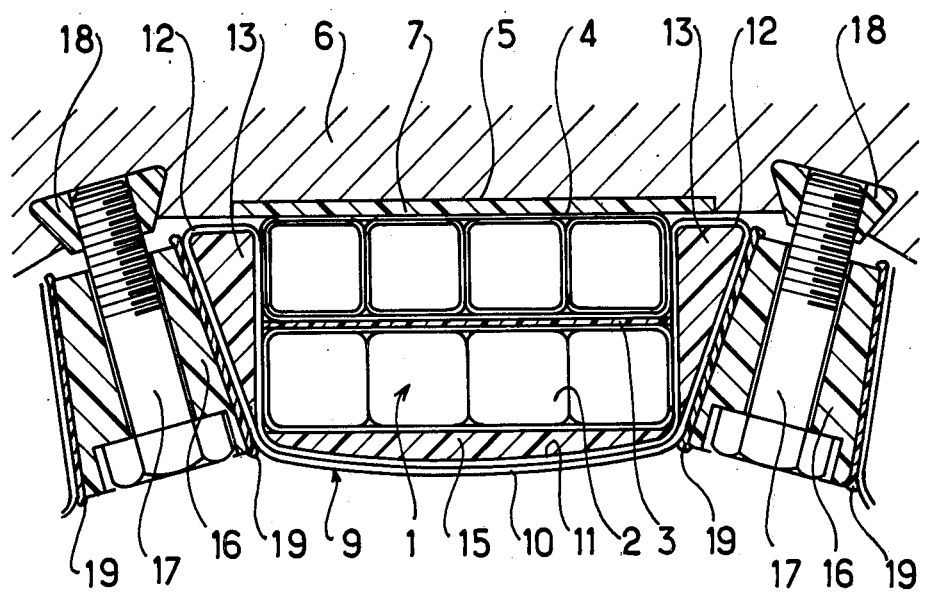
Figure 3:
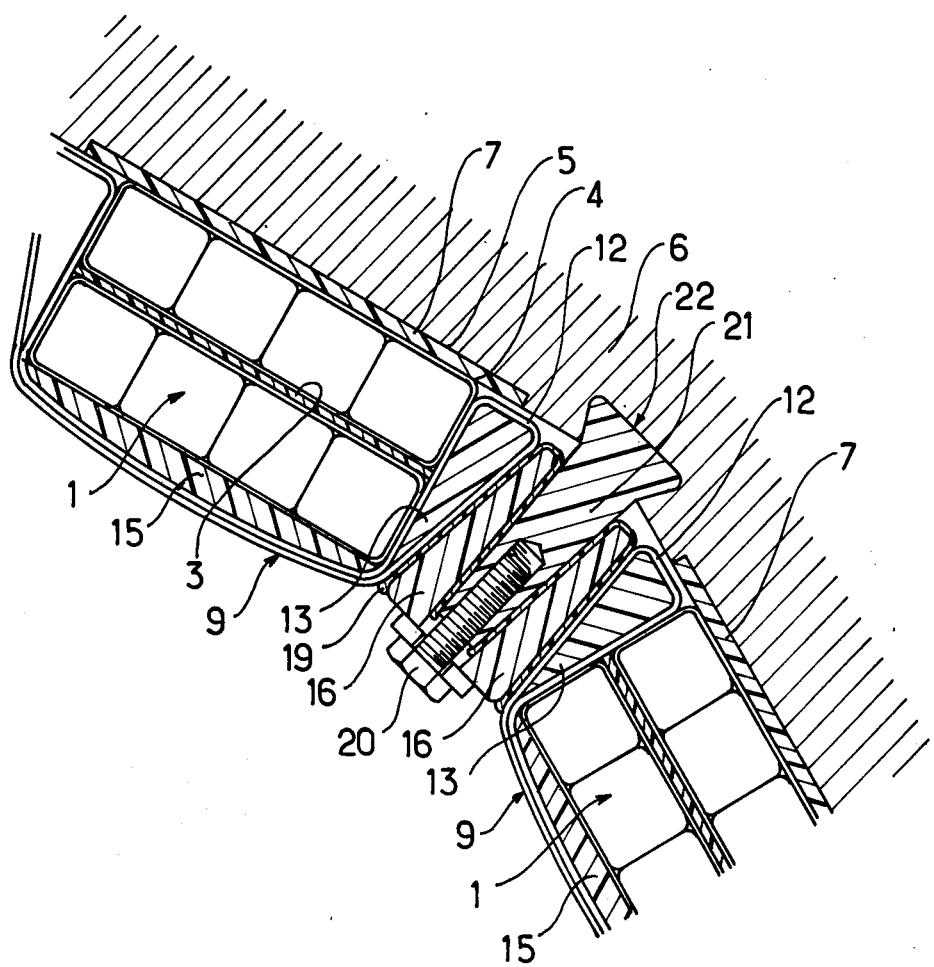

FIGS. 2 and 3 in two variants of wedges pulled by screws.

In FIG. 1, a bundle of bars 1 is constituedd by a set of bars 2 each formed by stacks, not shown, of conductors transposed in relation to one another, it being possible, more particularly, for the conductors to be transposed in the radial direction in relation to one another and to be constituted, themselves, by lengths transposed in the tangential direction. The bars 2 are grouped in the bundle 1 in two layers insulated from each other by an intermediate insulating part 3. The winding is effected, thus, from elements of two types corresponding to these two layers. The bundles have a rectangular cross-section and are applied by a bearing face 4 against a support face 5 of the magnetic stator surface 6 of an electric rotating machine, an insulating 7 being inserted in an intermediate position.

The magnetic circuit 6 comprises teeth 8 against which the bundles 1 bear tangentially. The bundles 1 are surrounded on their three faces other than the bearing face, by a set of straps 9 succeeding one another axially along the bundles 1. These straps 9 are each formed by an endless belt comprising, in its middle portion, two lengths 10, 11 applied against each other and at its ends, loops 12 surrounding chocks 13, made of an insulating material, which can extend along the whole axial length of the bundles 1 and whose cross-section is an elongated triangle with the point directed towards the opposite side to the support face 5. These chocks 13 are inserted between the small faces of the bundles 1 and the teeth 8, wedges 14 made of insulating material having a trapezoidal cross-section being inserted therebetween and succeeding one another axially along the bundles 1. Forming chocks 15, made of insulating material, are inserted between the straps 9 and the large face of the bundles 1 opposite to the bearing face 4; they have to undergo only slight centripetal stresses.

The two main stresses applied during operation on the bundles 1 are directed, the one radially towards the support face 5 and the other tangentially towards the teeth 8. These stresses are therefore firmly withstood by the magnetic circuit 6.

After installing, the set of straps, chocks and wedges undergoes polymerization.

In the case of FIG. 2, the magnetic circuit does not comprise any teeth and the chocks 13 are pushed radially towards the magnetic stator circuit 6 by wedges 16 made of an insulating material, pulled towards the magnetic circuit by screws 17 made of a moulded insulating material, for example, nylon reinforced with glass, screwing into nuts 18, made of a moulded insulating material, embedded in the magnetic circuit 6. Parts 19 made of a preimpregnated insulating material are inserted between the wedges 16 and the straps 9.

FIG. 3 shows an arrangement which is similar to that in FIG. 2, but the wedges 16 are pulled by screws 20 which screw into a radial extension 21 of parts 22 embedded in the magnetic circuit 6, that radial extension 21 acting, moreover, as a guide for the wedges 16 and being able, for that purpose, to comprise inclined faces increasing the clamping of the wedges 16 between the chocks 13.

The main advantage of the present invention resides in the fact that, due to the tightness of the strap, the bars are clamped permanently against the internal surface of the stator. The tightness of the strap is chosen so as to be sufficiently great for the bars to remain clamped against that surface during the operation of the machine.

Moreover, the use of radial screws enables a particularly easy tightening of the straps and thus enables, moreover, if necessary, the re-tightening of these straps after contingent ramming of the chocks, wedges or bars.

We claim:

1. Device for fixing groups of winding bars on the generally cylindrical internal surface of the magnetic circuit of the stator of an electric rotating machine having an axis of rotation, these groups of bars extending parallel to said axis with the external face of each group being against said internal surface of the stator, said device comprising:

straps stretched in a direction transverse to said axis, a middle portion of each of these straps bearing against the internal face of a group of bars, so that the external face of that group is clamped against said internal surface of the stator;

fastening elements fixed to said surface of the stator on each side of each group of bars; and chocks clamping the two end portions of each strap against the fastening elements and urging these end portions radially towards said stator surface to stretch said straps and urge said group toward said stator surface; the thickness of these chocks, measured in the circumferential direction, increasing in the direction from said axis to said stator surface.

2. Device according to claim 1, characterized in that each strap is resilient and is in the shape of a closed curve, that closed curve passing twice against the internal face of a group of bars and forming, on each side of that group of bars, a loop surrounding one of said chocks, the two intermediate portions of that curve which pass against the internal face of the group forming said middle portion, whereas the two loops form the end portions of that strap.

3. Device according to claim 1, wherein said fastening elements form a projecting part on said surface of the stator towards the inside and are provided with side detachable wedges, the thickness of which increases going away from that surface, that thickness being measured in the circumferential directon.

4. Device according to claim 3, characterized in that said fastening elements are fixed to said cylindrical stator surface by screws arranged radially so that, when these screws are screwed towards that surface, both said wedges and said chocks are moved towards that surface to cause tightening of said strap.

5. Devide according to claim 1, characterized in that a forming chock is inserted between said middle portion of each strap and the internal face of the group of bars fixed by that strap, the thickness of that chock increasing towards the middle of that internal face, that thickness being measured in the radial direction.

6. Device according to claim 1, wherein the end portions of each strap are in the form of closed loops, and wherein said chocks are located within said closed loops.

* * * * *